(12) United States Patent
Kim

(10) Patent No.: US 12,299,483 B2
(45) Date of Patent: May 13, 2025

(54) METHOD FOR MONITORING A TASK AND AN APPARATUS IMPLEMENTING THE SAME METHOD

(71) Applicant: HYUNDAI AUTOEVER CORP., Seoul (KR)

(72) Inventor: Young Hoon Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 550 days.

(21) Appl. No.: 17/535,046

(22) Filed: Nov. 24, 2021

(65) Prior Publication Data

US 2022/0188154 A1     Jun. 16, 2022

(30) Foreign Application Priority Data

Dec. 14, 2020    (KR) ........................ 10-2020-0174669

(51) Int. Cl.
   *G06F 9/46*        (2006.01)
   *G06F 9/30*        (2018.01)
   *G06F 9/4401*    (2018.01)
   *G06F 9/48*        (2006.01)

(52) U.S. Cl.
   CPC ........ *G06F 9/4881* (2013.01); *G06F 9/30189* (2013.01); *G06F 9/4406* (2013.01); *G06F 9/4812* (2013.01)

(58) Field of Classification Search
   CPC .. G06F 9/4881; G06F 9/30189; G06F 9/4406; G06F 9/4812
   See application file for complete search history.

(56) References Cited

U.S. PATENT DOCUMENTS

| | | | |
|---|---|---|---|
| 5,333,285 A * | 7/1994 | Drerup ................ | G06F 11/1415 |
| | | | 714/E11.132 |
| 7,996,732 B2 | 8/2011 | Nishimura | |
| 9,720,761 B2 | 8/2017 | Yu et al. | |
| 2008/0010563 A1 | 1/2008 | Nishimura | |
| 2016/0055046 A1 | 2/2016 | Yu et al. | |
| 2018/0217901 A1* | 8/2018 | Fujii ................... | G06F 11/1474 |

(Continued)

FOREIGN PATENT DOCUMENTS

| | | |
|---|---|---|
| CN | 103942034 A | 7/2014 |
| CN | 104102572 A | 10/2014 |
| EP | 1868095 B1 | 5/2019 |

(Continued)

OTHER PUBLICATIONS

Notice of Allowance cited in corresponding Korean patent application No. KR 10-2020-0174669; Sep. 5, 2022; 4 pp.

(Continued)

*Primary Examiner* — Gregory A Kessler
(74) *Attorney, Agent, or Firm* — Lempia Summerfield Katz LLC

(57) ABSTRACT

A method for monitoring a plurality of tasks comprises: reading an operation state entry flag written in a predetermined storage medium when each of the plurality of tasks enters a new operation state, wherein each of the plurality of tasks executed through a series of operation states that are sequentially passed through, and determining whether each of the plurality of tasks is in an abnormal state by using the result of the reading of the operation state entry flag.

13 Claims, 12 Drawing Sheets

(56) References Cited

U.S. PATENT DOCUMENTS

2021/0081238 A1\* 3/2021 Lamberts ................ G06F 17/40

FOREIGN PATENT DOCUMENTS

| | | |
|---|---|---|
| JP | 2013061783 A | 4/2013 |
| JP | 2020173644 A | 10/2020 |
| KR | 20090056124 A | 6/2009 |
| KR | 20100010390 A | 2/2010 |
| KR | 102023164 B1 | 9/2019 |
| KR | 102075689 B1 | 2/2020 |

OTHER PUBLICATIONS

Office Action cited in corresponding Korean patent application No. KR 10-2020-0174669; Jun. 24, 2022; 10pp.

Office Action cited in Chinese patent application No. 202111425259.7; Jan. 24, 2025; 8 pp.

\* cited by examiner

| | CONTENTS |
|---|---|
| A | ADD TASK TO BE EXECUTED TO BUFFER AND THEN REQUEST INTERRUPT |
| B | CHECK TASK IN BUFFER AND THEN PERFORM OS SCHEDULING (ISR DUE TO INTERRUPT OF A STEP) |
| C | TASK IS OPERATED BY OS SCHEDULING |
| D | EXECUTION OF TASK IS COMPLETED |

METHOD FOR MONITORING A TASK AND AN APPARATUS IMPLEMENTING THE SAME METHOD

CROSS-REFERENCE TO RELATED APPLICATION

This application claims priority to and the benefit of Korean Patent Application No. 10-2020-0174669, filed on Dec. 14, 2020, the entire contents of which are incorporated herein by reference.

FIELD

The present disclosure relates to a task monitoring method for monitoring a task executed in an Operating System (OS) and an apparatus for implementing the same.

BACKGROUND

The statements in this section merely provide background information related to the present disclosure and may not constitute prior art.

A Micro Controller Unit (MCU) is a small microcomputer in which application software is modularly designed in units of software components and functions of the software components are implemented through code units called a runnable. In a MCU, a task is a unit of job scheduling for the OS to allocate resources to execute software. An application software is executed as a runnable unit mapped to a task.

In order to detect a real-time error of a task that may occur during software execution in an MCU having a multi-core structure, an additional MCU for task monitoring may be needed in current systems. In this case, the cost associated with preparing an additional MCU for monitoring increases. When an additional semiconductor chip such as an additional MCU is used, communication between the chips should be also configured, thereby increasing the Central Processing Unit (CPU) load of the main MCU.

SUMMARY

Accordingly, the technical problem is the need for an apparatus and a method capable of performing a monitoring function only using the main MCU without using an additional MCU or a separate module when monitoring a task to detect a real-time error of a task.

The disclosed embodiments provide a technical solution of providing a task monitoring method capable of detecting a real-time error of a task only with the main MCU without an additional MCU or a separate module, and an apparatus for implementing the same.

The disclosed embodiments further provide a technical solution of providing a task monitoring method capable of monitoring whether each of a plurality of tasks is normally executed without increasing CPU load in an MCU of a multi-core structure and an apparatus for implementing the same.

The disclosed embodiments further provide a technical solution of providing a task monitoring method in an MCU of a multi-core structure capable of monitoring the omission or error of a task by writing the operation state of each of a plurality of tasks in a separate memory area and reading it, and an apparatus for implementing the same.

The technical problems that the present disclosure solve are not limited to the technical problems mentioned above, and other technical problems not mentioned should be clearly understood by those of ordinary skill in the art from the description below.

According to an aspect of the present disclosure, a method for monitoring a plurality of tasks is provided. The method comprises reading an operation state entry flag written in a predetermined storage means, e.g., a predetermined storage medium, when each of the plurality of tasks enters a new operation state, wherein each of the plurality of tasks is executed through a series of operation states that are sequentially passed through and determining whether each of the plurality of tasks is in an abnormal state by using the result of the reading of the operation state entry flag.

Reading an operation state entry flag written in a predetermined storage medium when each of the plurality of tasks executed through the series of operation states that are sequentially passed through enters a new operation state may comprise setting an execution period of a task of the plurality of tasks having a minimum execution period among the plurality of tasks as a set read period of the operation state entry flag, and reading a value of the operation state entry flag written in the predetermined storage medium for each of the set read period.

The series of operation states may include a first state of adding the task to a buffer, e.g., a queue, and requesting an interrupt, a second state of scheduling, e.g., OS scheduling, the task added to the buffer to an OS, a third state of operating the task by the scheduling, and a fourth state in which the operation of the task is completed.

Reading an operation state entry flag written in a predetermined storage medium when each of the plurality of tasks executed through the series of operation states that are sequentially passed through enters a new operation state may comprise setting a normal operation time for each operation state of each task based on an execution period of each task and storing the operation state entry flag when each task enters a new operation state within the set normal operation time.

Determining whether each of the plurality of tasks is in an abnormal state by using the result of the reading of the operation state entry flag may comprise determining the task as an abnormal state if there is an operation state, in which an operation state entry flag is not stored among the series of operation states.

Determining the task as an abnormal state if there is an operation state in which an operation state entry flag is not stored among the series of operation states may comprise determining that an error occurs in the operation state in which the operation state entry flag is not stored.

The method may further comprise calculating a number of the plurality of tasks before the plurality of tasks are executed, checking whether the number of normally executed tasks matches the number of tasks calculated before the execution when the execution of the plurality of tasks is completed, and determining that task omission occurs when the number of normally executed tasks does not match the number of tasks calculated before the execution.

Calculating the number of the plurality of tasks before the plurality of tasks are executed may comprise calculating the number of the plurality of tasks by executing the first period task of each of the plurality of tasks at a time of initializing an OS.

Checking whether the number of normally executed tasks matches the number of tasks calculated before the execution when the execution of the plurality of tasks is completed comprises storing the number of normally executed tasks among the plurality of tasks in a predetermined storage medium at a time when the execution of each of the plurality of tasks is completed and comparing the number of the stored normally executed tasks and the number of tasks calculated before the execution.

Determining whether each of the plurality of tasks is in an abnormal state by using the result of the reading of the operation state entry flag may comprise resetting a CPU when the task is in an abnormal state or an error occurs.

The predetermined storage medium may be a local memory area (LMU).

The method may further comprise allocating a dynamic memory for writing a flag variable of the task at a time when the first task among the plurality of tasks is executed and returning the dynamic memory when execution of the last task of the plurality of tasks is completed.

The method may be performed on a platform of a multi-core structure including a plurality of cores for executing one or more tasks of the plurality of tasks and a monitoring core for monitoring whether each of the plurality of tasks is in an abnormal state.

According to an aspect of the disclosure, there is provided a non-transitory computer readable recording medium storing computer executable-instructions for causing a computer to execute the method.

According to an aspect of the inventive concept, there is provided a computing device of a multi-core structure. The computing device comprises a processor of a multi-core structure including a plurality of cores for executing one or more tasks among a plurality of tasks, and a monitoring core for executing a monitoring operation of each of the plurality of tasks, and a local memory area, to which a flag variable of each of the plurality of tasks is allocated. The processor executes a computer program including computer-executable instructions for performing operations comprising reading an operation state entry flag written in the local memory area when each of the plurality of tasks enters a new operation state, wherein the each of the plurality of tasks executed through a series of operation states are sequentially passed through, and determining whether each of the plurality of tasks is in an abnormal state by using the result of the reading of the operation state entry flag.

The series of operation states may include a first state of adding the task to a buffer and requesting an interrupt, a second state of scheduling the task added to the buffer to an OS, a third state of operating the task by the scheduling, and a fourth state, in which the operation of the task is completed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
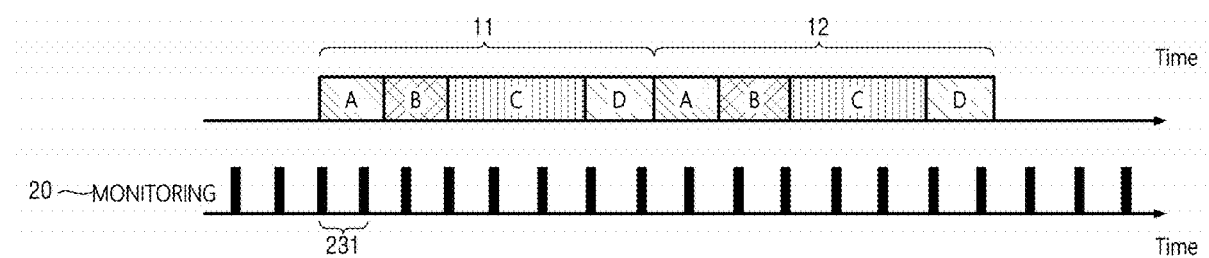
FIG. 1 is a conceptual diagram according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present disclosure are described below with reference to the attached drawings. Advantages and features of the present disclosure and methods of accomplishing the same may be understood more readily by reference to the following detailed description of various embodiments and the accompanying drawings. The present disclosure may, however, be embodied in many different forms and should not be construed as being limited to the embodiments set forth herein. Rather, these embodiments are provided so that this disclosure is thorough and complete and fully conveys the concept of the disclosure to those of ordinary skill in the art.

It should be noted that the same reference numerals of the components of the drawings are assigned to the same components in each drawing as much as possible even though they are shown in different drawings. In addition, when describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those of ordinary skill in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, when describing the components of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having a purpose or performing an operation, function, or the like, the component, device, or element should be considered herein as being "configured to" meet that purpose or to perform that operation or function.

Hereinafter, some embodiments of the present disclosure are described in detail below with reference to the accompanying drawings.

FIG. 1 is a conceptual diagram according to an embodiment of the present disclosure. Referring to FIG. 1, a task error that may occur while the first task 11 and the second task 12 are executed in an MCU having a single-core structure may be monitored.

In the illustrated example, each of the first task 11 and the second task 12 is executed through a series of operation states that are sequentially passed through. In this example, the series of operation states may include a first state A that adds a task to the buffer and that requests an interrupt, a second state B that schedules the task added to the buffer to the OS, and a third state C in which the task is operated by the scheduling, and a fourth state D, in which the operation of the task is completed.

The first task 11 and the second task 12 are monitored at a predetermined time interval 231. For example, the predetermined time interval 231 may be set as an execution period of a task having a minimum execution period among a plurality of tasks.

In an embodiment, whenever each of the first task 11 and the second task 12 newly enters any one of the series of operation states A, B, C, or D, an operation state entry flag may be written in a predetermined storage means, e.g., a predetermined storage medium. At this time, it may be determined whether each of the first task 11 and the second task 12 is in an abnormal state by reading the operation state entry flag written in the predetermined storage medium.

According to the embodiment of the present disclosure as described above, it is possible to detect a real-time error of a task only the main MCU without an additional MCU or a separate module.

Figure 2:
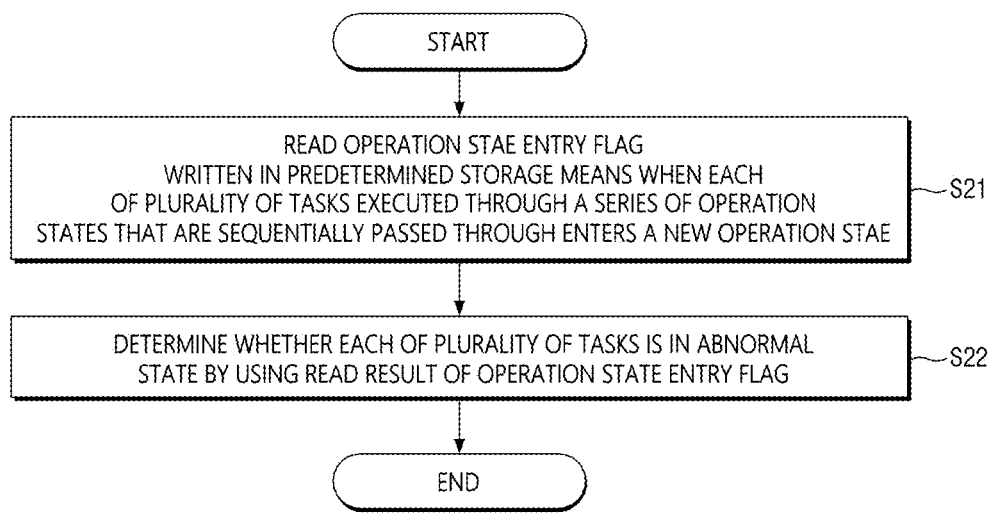
FIG. 2 is a flowchart illustrating a task monitoring method according to an embodiment of the present disclosure.

FIG. 2 is a flowchart for illustrating a task monitoring method according to an embodiment of the present disclosure.

Figure 3:
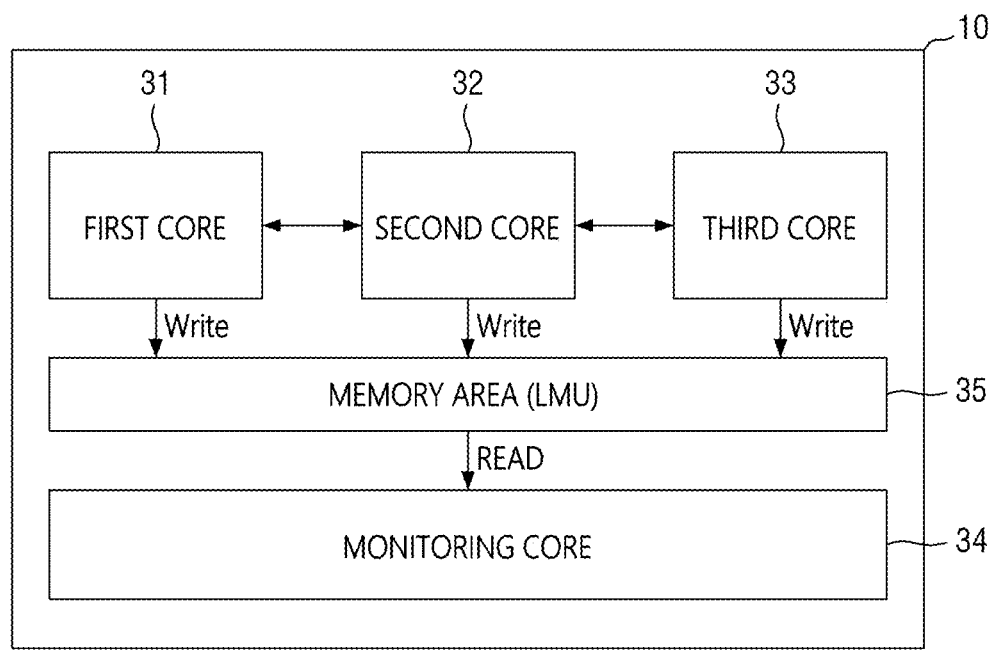
FIG. 3 is a block diagram of a computing device of a multi-core structure according to another embodiment of the present disclosure.
Figure 12:
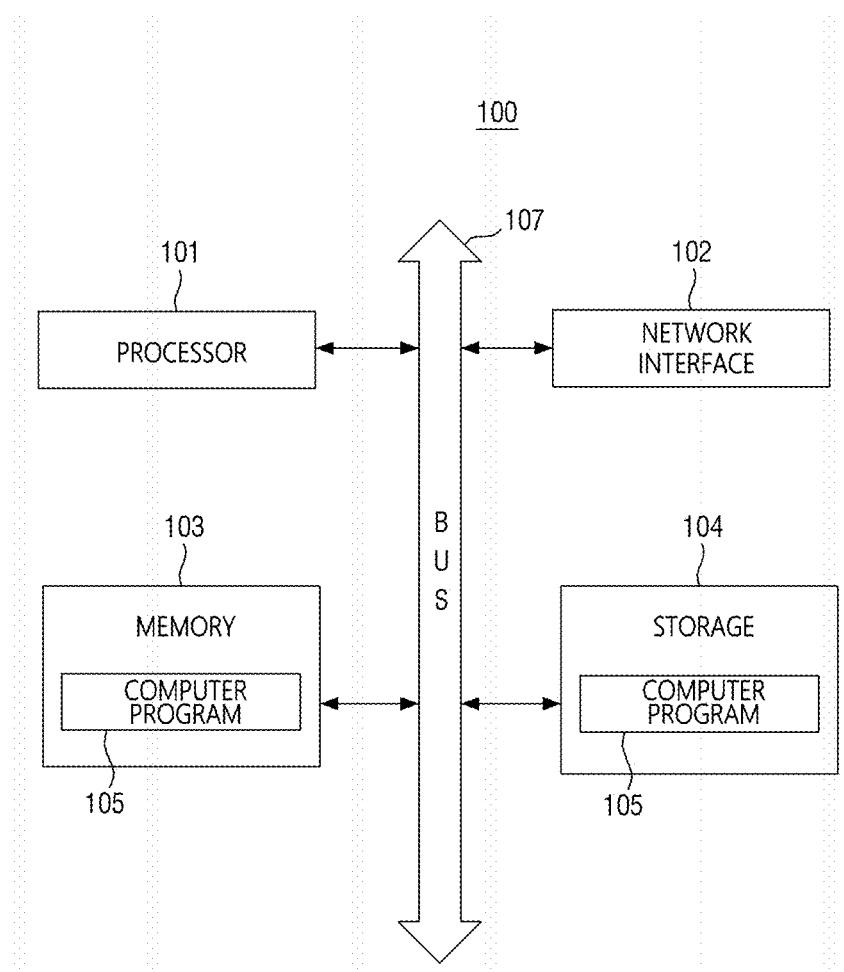
FIG. 12 is a hardware configuration diagram of a computing device that may implement methods according to some embodiments of the present disclosure.

The method according to an embodiment of the present disclosure may be executed by the computing device 10 of a multi-core structure shown in FIG. 3 or the computing device 100 shown in FIG. 12. The computing device 10 of a multi-core structure or the computing device 100 executing the method according to the present embodiment may be a computing device having an application program execution environment. It should be noted that the description of the subject performing some operations included in the method according to the embodiment of the present disclosure may be omitted, and in that case, the subject is the computing device 10 of a multi-core structure or the computing device 100.

Referring to FIG. 2, first, in operation S21, when each of a plurality of tasks executed through a series of operation states that are sequentially passed through enters a new operation state, an operation state entry flag written in a predetermined storage medium is read. The predetermined storage medium may be, for example, an LMU. In this embodiment, the series of operation states may include a first state that adds a task to a buffer and requests an interrupt, a second state that schedules the task added to the buffer to the OS, a third state in which the task is operated by the scheduling, and a fourth state in which the operation of the task is completed.

In an embodiment, operation S21 may include an operation of setting an execution period of a task having a minimum execution period among a plurality of tasks as a read period of an operation state entry flag, and an operation of reading a value of an operation state entry flag written in a predetermined storage medium for each set read period.

In an embodiment, operation S21 may include an operation of setting a normal operation time for each operation state of each task based on the execution period of each task, and an operation of storing an operation state entry flag when each task enters a new operation state within the set normal operation time.

Next, in operation S22, it is determined whether each of the plurality of tasks is in an abnormal state using the result of the reading of the operation state entry flag.

In an embodiment, operation S22 may include an operation of determining that a corresponding task is in an abnormal state when there is the operation state in which an operation state entry flag is not stored among a series of operation states. Also, operation S22 may include an operation of determining that an error occurs in an operation state in which an operation state entry flag is not stored.

In an embodiment, the method may include an operation of calculating the number of the plurality of tasks before the plurality of tasks are executed, an operation of checking whether the number of normally executed tasks and the number of tasks calculated before the execution match, and an operation of determining that task omission occurs when the number of normally executed tasks and the number of tasks calculated before execution do not match.

In this case, when calculating the number of the plurality of tasks, the number of the plurality of tasks may be calculated by executing the first period task of each of the plurality of tasks at the time of initializing an OS. In addition, when the execution of each of the plurality of tasks is completed, the number of normally executed tasks among the plurality of tasks may be stored in a predetermined storage medium. The number of stored tasks may be checked to determine whether there is an omitted task by comparing the number of stored tasks and the number of the plurality of tasks calculated before execution.

In an embodiment, operation S22 may further include an operation of resetting the CPU when the task is in an abnormal state or an error occurs.

In an embodiment, the method may further include an operation of allocating a dynamic memory for writing a flag variable of a task at a time when the first task among a plurality of tasks is executed, and an operation of returning a dynamic memory when the execution of the last task among the plurality of tasks is completed. Accordingly, memory can be efficiently allocated during the task monitoring.

In an embodiment, the method may be performed on a platform of a multi-core structure including a plurality of cores for executing one or more tasks among a plurality of tasks, and a monitoring core for monitoring whether each of the plurality of tasks is in an abnormal state. Accordingly, by separating the core for executing the plurality of tasks and the core for monitoring the plurality of tasks, it is possible to prevent an increase in CPU load and to solve the problem that the execution completion of the task is delayed due to the task monitoring.

According to the method according to the embodiment of the present disclosure as described above, the omission of the task or error can be monitored by writing the operation state of each of the plurality of tasks in a separate memory area and reading it. Accordingly, it is possible to monitor whether each of the plurality of tasks is normally executed without increasing the CPU load.

FIG. 3 is a block diagram of a computing device of a multi-core structure according to another embodiment of the present disclosure. Referring to FIG. 3, the computing device 10 according to an embodiment of the present disclosure includes a processor of a multi-core structure including a plurality of cores 31, 32, and 33 for executing one or more tasks among a plurality of tasks, a monitoring core 34 for monitoring whether each of the plurality of tasks is in an abnormal state, and a configuration of a memory area 35 in which a flag variable related to an operation state of each of a plurality of tasks is stored.

Each of the plurality of tasks executed in at least one of the plurality of cores 31, 32, and 33 is executed through a series of operation states that are sequentially passed through. A series of operation states include a first state A that adds a task to the buffer and requests an interrupt, a second state B that schedules the task added to the buffer to the OS, a third state C in which the task is operated by the scheduling, and a fourth state D, in which the operation of the task is completed.

As an embodiment, an operation state entry flag may be written in the memory area 35 whenever each of the plurality of tasks is executed to enter a new operation state. In this embodiment, the memory area 35 may be, for example, an LMU. For example, when the task is executed and the first state A of a series of operation states is completed and enters the second state B, the value '1' of the operation state entry flag for the first state A may be written to indicate that the first state A has been normally executed.

In an embodiment, the monitoring core 34 may read the operation state entry flag written in the memory area 35 in order to monitor whether each of the plurality of tasks is in an abnormal state.

In other words, in the plurality of cores 31, 32, and 33, while each of the plurality of tasks is executed, it is possible to monitor whether each of the plurality of tasks is in an abnormal state by writing the operation state entry flag of each task in the memory area 35 and reading the operation state entry flag written in the memory area 35 by the monitoring core 34. Accordingly, by separating the core on which the task is executed, and the core on which the task is monitored, the CPU load can be prevented from increasing by the monitoring operation.

Figure 4:
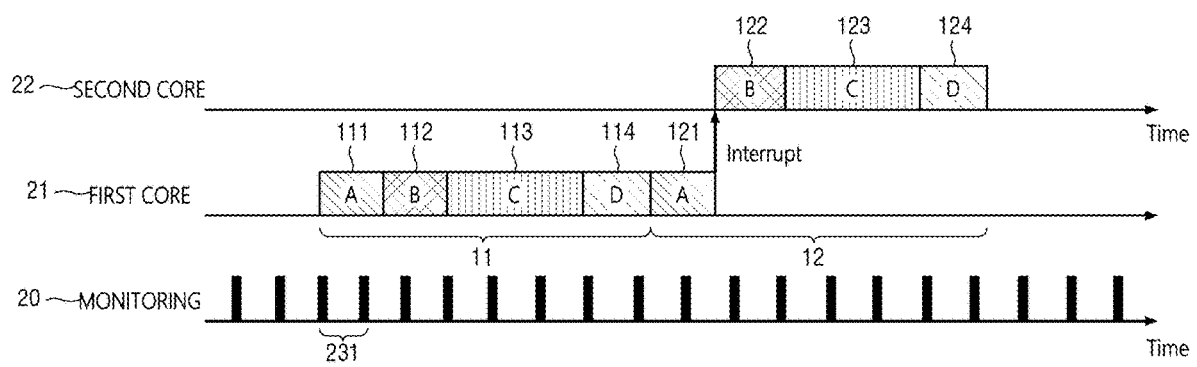
FIG. 4 illustrates an example of monitoring the operation state of a task in a multi-core structure according to some embodiments of the present disclosure.

FIG. 4 illustrates an example of monitoring the operation state of a task in a multi-core structure according to some embodiments of the present disclosure. Referring to FIG. 4, in an MCU having a multi-core structure, an error of a task that may occur while the first task 11 and the second task 12 are executed may be monitored.

In the illustrated example, the first task 11 is executed on the first core 21, and the second task 12 is executed on the second core 22. The first task 11 may sequentially execute a series of operation states 111, 112, 113, and 114, and the second task 12 may sequentially execute a series of operation states 121, 122, 123, and 124.

In this case, the first operation state 121 among a series of operation states 121, 122, 123, and 124 executed by the second task 12 may be executed by the first core 21. In this embodiment, the series of operation states sequentially executed by the first task 11 and the second task 12 may include a first state A that adds a task to a buffer and requests an interrupt, a second state B that schedules the task added to the buffer to the OS, a third state C in which the task is operated by the OS scheduling, and a fourth state D, in which the operation of the task is completed.

In an embodiment, the first task 11 and the second task 12 executed in the first core 21 and the second core 22 may be monitored 20 at a predetermined time interval 231. For example, the predetermined time interval 231 may be set as an execution period of a task having a minimum execution period among a plurality of tasks.

In an embodiment, whenever each of the first task 11 and the second task 12 newly enters into any one of the series of operation states A, B, C, or D, the computing device 10 of the multi-core structure may monitor whether each of the first task 11 and the second task 12 is in an abnormal state by writing the operation state entry flag in a predetermined storage medium, and by reading the operation state entry flag written in the storage medium.

According to the above embodiment, in the MCU of a multi-core structure, it is possible to monitor whether each of the plurality of tasks is normally executed without increasing the CPU load.

Figure 5:
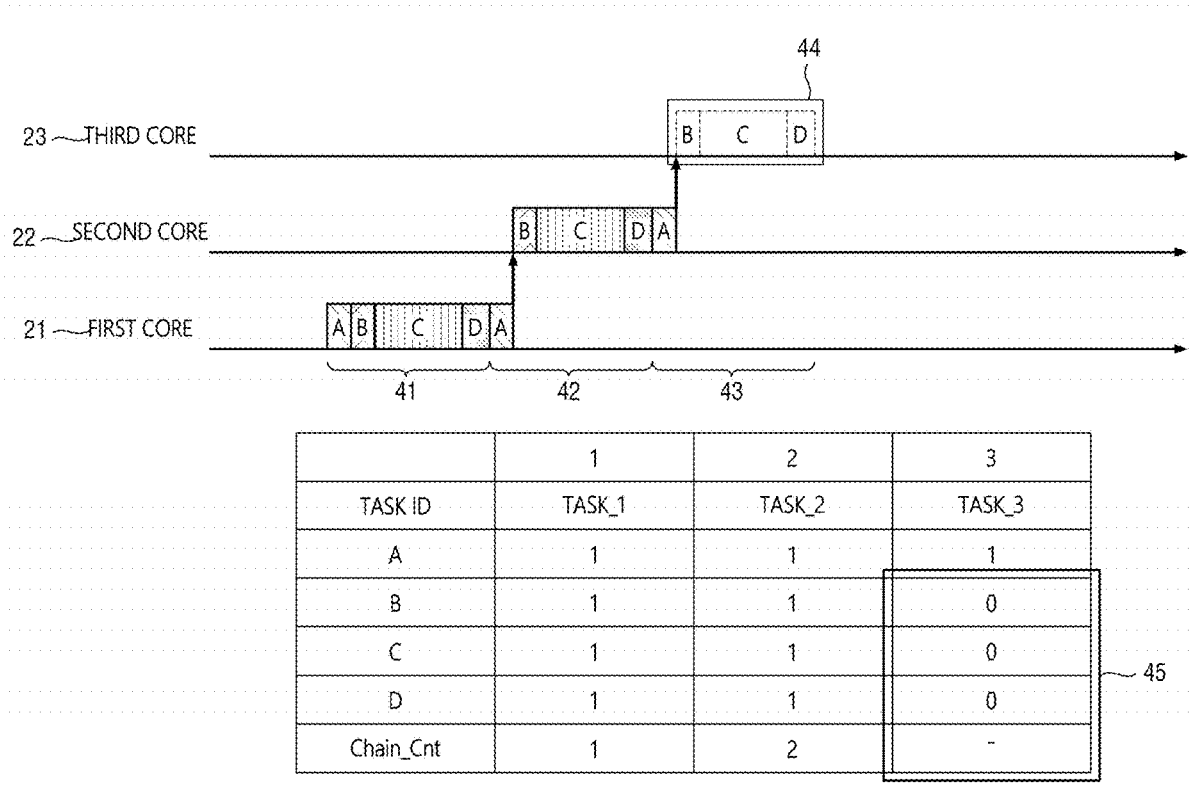
FIGS. 5-7 are examples of displaying flags written according to whether a task enters each operation state according to some embodiments of the present disclosure.
Figure 6:
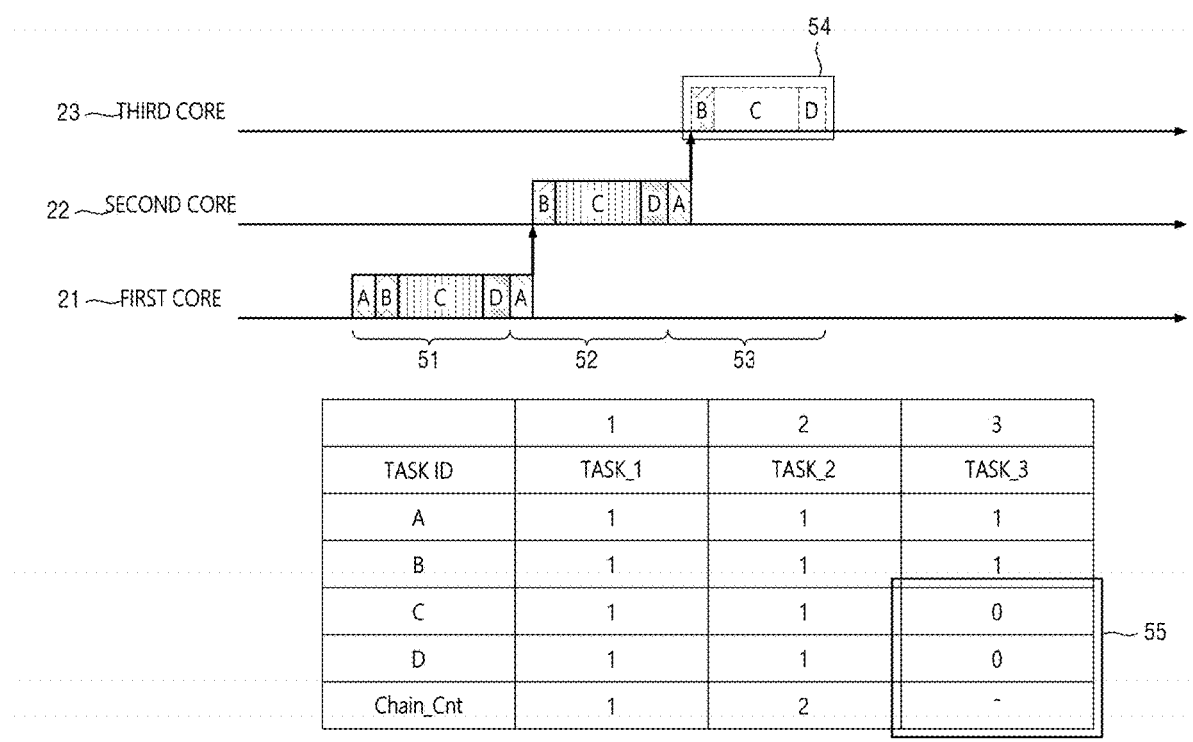
Figure 7:
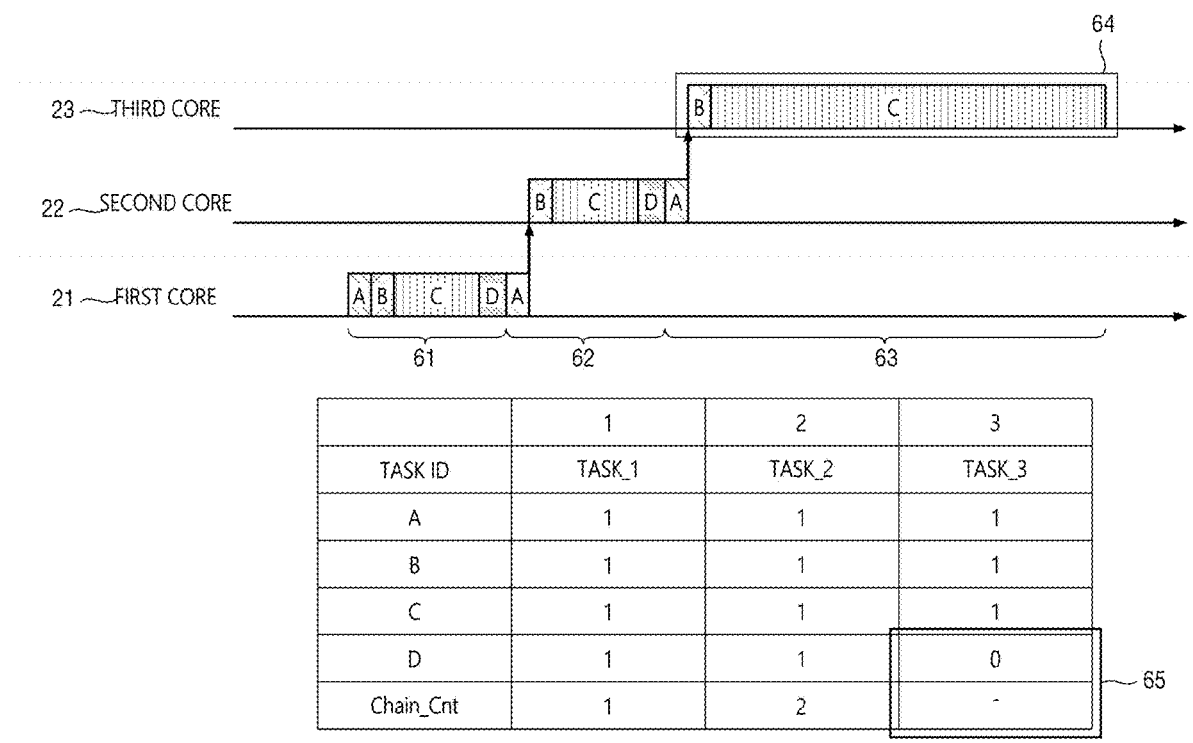

FIGS. 5-7 are examples of displaying flags written according to whether a task enters each operation state according to some embodiments of the present disclosure.

Referring to FIG. 5, while the first task 41, the second task 42, and the third task 43 are executed in the first core 21, the second core 22, and the third core 23, a flag related to a series of operation states that each task sequentially executes may be stored.

In the illustrated example, if each of the series of operation states A, B, C, and D is normally executed while the first task 41 and the second task 42 are executed, the value '1' of the operation state entry flag for each of the operation states A, B, C, and D is written.

However, in the case of the third task 43, the first state A of a series of operation states A, B, C, and D is normally executed and the value '1' of the operation state entry flag for the first state A is written, but as the second state B is not executed, all of the operation state entry flags for the second state B, the third state C, and the fourth state D may not be written. At this time, when the operation state entry flag is not written, '0' may be automatically written (45) as a default value.

In the illustrated example, it may be determined that the task omission (44) due to non-execution of the second state B is caused by an interrupt service routine (ISR) problem caused by an interrupt executed in the first state A.

Referring to FIG. 6, when each of a series of operation states A, B, C, and D is normally executed while the first task 51 and the second task 52 are executed, the value '1' of the operation state entry flag for each of the operation states A, B, C, and D is written.

However, in the case of the third task 53, the first state A and the second operation state B among a series of operation states A, B, C, and D are normally executed, so that the values of the operation state entry flags for each of the first state A and the second operation state B were all written as '1.' However, as the third state C is not executed, neither the operation state entry flags for the third state C and the fourth state D are written, or '0' as a default value may be automatically written (55).

In the illustrated example, it may be determined that the task omission (54) due to non-execution of the third state C is caused by a problem in OS scheduling executed in the second state B.

Referring to FIG. 7, when each of a series of operation states A, B, C, and D is normally executed while the first task 61 and the second task 62 are executed, the value '1' of the operation state entry flag for each of the operation states A, B, C, D is written.

However, in the case of the third task 63, since the first state A, the second operation state B, and the third operation state C among a series of operation states A, B, C, and D are normally executed, the values of the operation state entry flags for each of the first state A, the second operation state B, and the third operation state C were all written as '1.' However, as the fourth state D is not executed, the operation state entry flag for the fourth state D may not be written, or '0' may be automatically written (65) as a default value.

In the illustrated example, it may be determined that the task omission (64) due to non-execution of the fourth state D is caused by a problem in the task operation executed in the third state B.

As described above, according to the embodiment of the present disclosure, it is possible to monitor in real time whether the task is normally executed using each operation state entry flag written in a predetermined storage medium during execution of the task.

Figure 8:
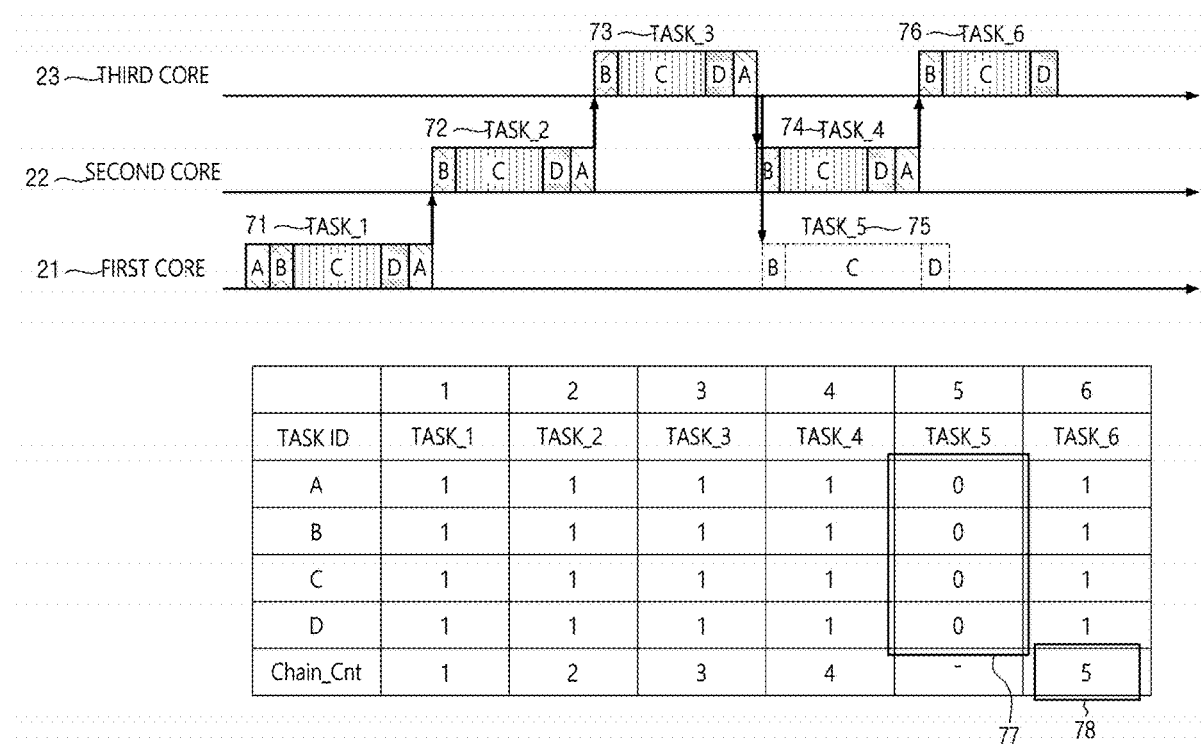
FIG. 8 is an example of determining whether a task is omitted by comparing the number of normally executed tasks with the number of actual tasks according to some embodiments of the present disclosure.

FIG. 8 is an example of determining whether a task is omitted by comparing the number of normally executed tasks and the number of actual tasks according to some embodiments of the present disclosure. Referring to FIG. 8, if the values of the operation state entry flags for each of a series of operation states A, B, C, and D sequentially executed by the fifth task 75 are all written as '0' (77), it may be determined that the omission of the fifth task 75 occurred.

In an embodiment, instead of determining whether the task is omitted by reading the value of the operation state entry flag, it may be determined whether the task is omitted by comparing the number of normally executed tasks among the plurality of tasks and the number of actual tasks.

In the illustrated example, when the plurality of tasks 71, 72, 73, 74, 75, and 76 are scheduled to be sequentially executed in the plurality of cores 21, 22, and 23, the number of normally executed tasks is stored at a time when the execution of each task is completed. When the execution of the last task 76 is completed, the number of stored tasks 78 may be read to determine whether it matches the number of actual tasks. For example, when the number 78 of normally executed tasks stored for the last task 76 is '5' and the number of actual tasks is '6,' it may be determined that the omission of the task occurs. In this case, the task 75 in which the number of normally executed tasks is not stored, may be determined as an omitted task.

Figure 9:
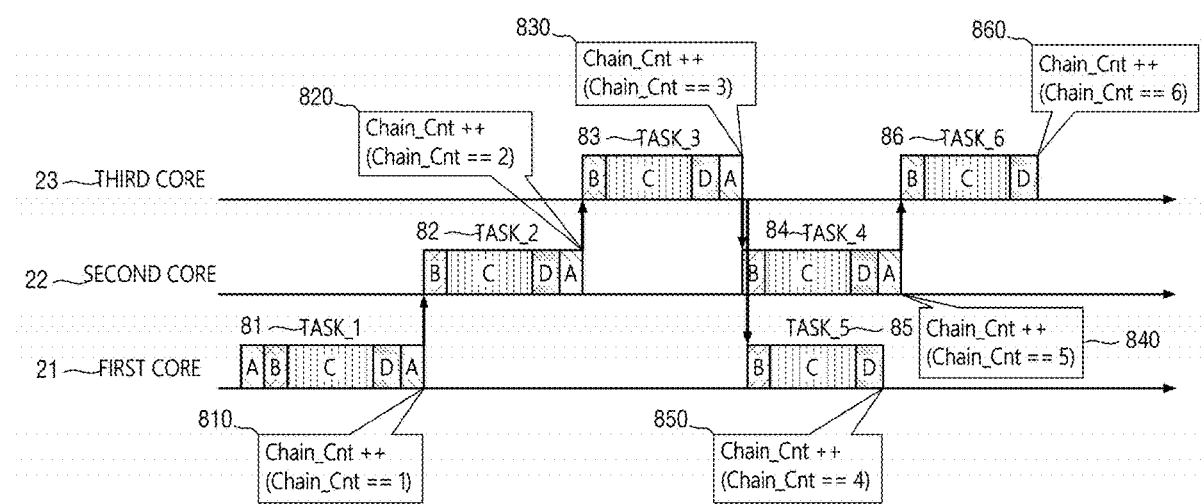
FIG. 9 illustrates logic for determining the number of actual tasks according to some embodiments of the present disclosure.

FIG. 9 illustrates a logic for determining the number of actual tasks according to some embodiments of the present disclosure. Referring to FIG. 9, when a plurality of tasks 81, 82, 83, 84, 85 and 86 are scheduled to be sequentially executed in a plurality of cores 21, 22, and 23, the number of actual tasks can be calculated by executing the first period task of each of a plurality of tasks at the time of initializing the OS.

In the illustrated example, if the first period task of each task is executed at the time of initializing the OS, when the execution of each task is completed, a flag value indicating the number of actual tasks may be increased by 1 and stored. For example, when the execution of the first task 81 is completed, '1' is stored in the flag variable (Chain_Cnt) (810), and when the execution of the second task 82 is completed, the stored flag may be increased by 1 and '2' may be stored (820). In this way, when the execution of the sixth task 86, which is the last task, is completed, '6' is stored in the flag variable (860), and the number of actual tasks may be calculated as '6.' Whether a task is omitted may be determined by comparing the number of actual tasks calculated in this way and the number of normally executed tasks.

Figure 10:
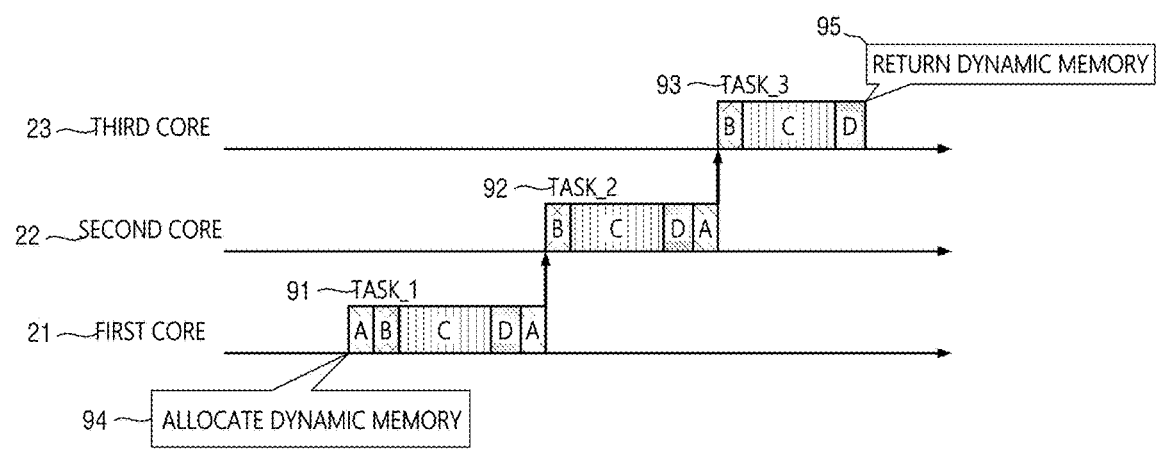
FIG. 10 illustrates an example in which a flag variable of a task is allocated to a memory according to some embodiments of the present disclosure.

FIG. 10 illustrates an example, in which a flag variable of a task is allocated to a non-transitory memory according to some embodiments of the present disclosure. Referring to FIG. 10, an example of assigning a memory for storing a flag variable for each of a series of operation states executed by each of the plurality of tasks 91, 92, and 93 when monitoring the plurality of tasks 91, 92, and 93 is shown.

In the illustrated example, a dynamic memory for storing a flag variable for each of a series of operation states is allocated (94) at the time when the execution of the first task 91 that is executed first among the plurality of tasks 91, 92, and 93 is started. The dynamic memory is returned (95) when the execution of the third task 93 that is executed last is completed so that the memory can be efficiently used. In this case, the dynamic memory, in which the flag variable is stored, may be allocated and managed, for example, in the LMU 35. Accordingly, since the monitoring core 34, on which the task monitoring is executed, only reads the flag variable stored in the LMU, data collision does not occur, and high performance can be achieved.

Figure 11:
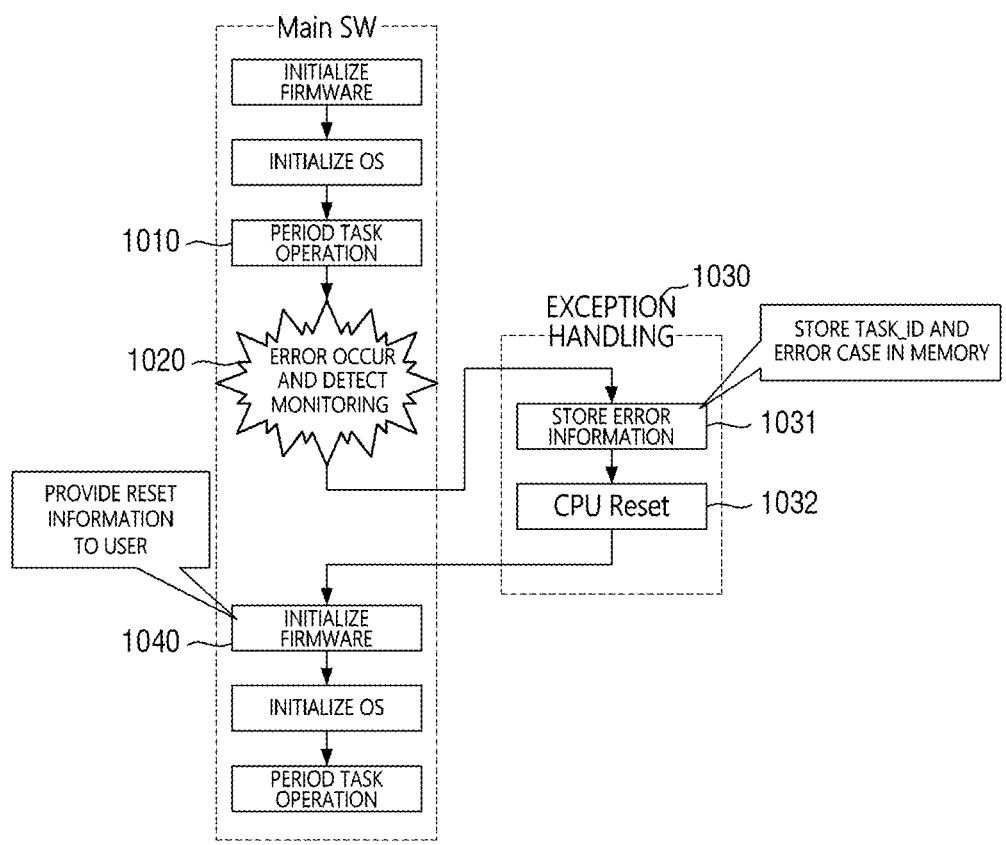
FIG. 11 illustrates an example of performing exception handling when an error occurs in a task according to some embodiments of the present disclosure.

FIG. 11 illustrates an example of executing exception handling when an error occurs in a task according to some embodiments of the present disclosure. Referring to FIG. 11, a task in an abnormal state or when an error occurs may be detected (1020) through task monitoring while a plurality of tasks are executed (1010). At this time, when a task in an abnormal state or when an error occurs is detected, an exception handling operation (1030) of storing information about the abnormal state and error of the task (1031) and resetting the CPU (1032) may be executed.

In this case, the information about the error may be stored (1031) immediately before the CPU is reset (1032), and, for example, the task ID that caused the error and the error type may be stored in the memory.

Also, reset information may be updated at a time when the firmware is initialized (1040), and the updated reset information may be provided to a user.

FIG. 12 is a hardware configuration diagram of a computing device that may implement the methods according to some embodiments of the present disclosure.

Referring to FIG. 12, the computing device 100 may include one or more processors 101, a bus 107, a network interface 102, a non-transitory memory 103, which loads a computer program 105 executed by the processors 101, and a storage 104 for storing the computer program 105. However, FIG. 12 illustrates only the components related to the embodiment of the present disclosure. Therefore, it should be appreciated by those of ordinary skill in the art that the present disclosure may further include other general purpose components in addition to the components shown in FIG. 12.

The processor 101 controls the overall operation of each component of the computing device 100. The processor 101 may be implemented as, for example, an MCU of a multi-core structure.

In an embodiment, the processor 101 may be implemented as an electronic control unit (ECU) of a multi-core structure including a plurality of cores for executing one or more tasks among a plurality of tasks, and a monitoring core for executing a monitoring operation of each of the plurality of tasks.

The processor 101 controls overall operations of each component of the computing device 100. The processor 101 may be configured to include at least one of a CPU, a Micro Processor Unit (MPU), an MCU, a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM but is not limited thereto.

The bus 107 provides communication between components of the computing device 100. The bus 107 may be implemented as various types of bus such as an address bus, a data bus, and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

In an embodiment, the computer program 105 may include computer readable instructions for performing an operation of reading an operation state entry flag written in the local memory area when each of the plurality of tasks executed through a series of operation states that are sequentially passed through enters a new operation state and determining whether each of the plurality of tasks is in an abnormal state by using the result of the reading of the operation state entry flag.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to another computing device via a network such as the internet and installed in the other computing device. Thereby, the computer program may be used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to various embodiments thereof, it should be understood by those of ordinary skill in the art that various changes in form and detail may be made therein without departing from the spirit and scope of the present disclosure as defined by the following claims. The embodiments should be considered in a descriptive sense only and not for purposes of limitation.

What is claimed is:

1. A method for monitoring a plurality of tasks being performed by a computing device of a multi-core structure, the multi-core structure including a plurality of cores and a monitoring core, the method comprising:
   by the monitoring core, acquiring a result of reading an operation state entry flag written in a predetermined storage medium when each of the plurality of tasks enters a new operation state in the plurality of cores, wherein each of the plurality of tasks is executed through a series of operation states that are sequentially passed through, in the plurality of cores;
   by the monitoring core, identifying whether each of the plurality of tasks is in an abnormal state by using the result of the reading the operation state entry flag; and
   by the monitoring core, executing an exception handling operating related to the task identified as being in the abnormal state,
   wherein the series of operation states include a first state of adding a task of the plurality of tasks to a buffer and requesting an interrupt, a second state of scheduling the task added to the buffer to an Operating System (OS), a third state of operating the task by the scheduling, and a fourth state in which the operation of the task is completed.

2. The method of claim 1, wherein acquiring a result of reading an operation state entry flag written in a predetermined storage medium comprises:
   setting, among the plurality of tasks, an execution period of a task having a minimum execution period as a set read period of the operation state entry flag; and
   reading a value of the operation state entry flag written in the predetermined storage medium for each of the set read period of the operation state entry flag.

3. The method of claim 1, wherein acquiring a result of reading an operation state entry flag written in a predetermined storage medium when each of the plurality of tasks executed through the series of operation states that are sequentially passed through enters a new operation state comprises:

setting a normal operation time for each operation state of each task based on an execution period of each task; and storing the operation state entry flag when each task enters a new operation state within the set normal operation time.

4. The method of claim 1, wherein identifying whether each of the plurality of tasks is in an abnormal state by using the result of the reading of the operation state entry flag comprises:

identifying a task of the plurality of tasks as an abnormal state when there is an operation state in which an operation state entry flag is not stored, among the series of operation states.

5. The method of claim 4, wherein identifying the task as an abnormal state when there is an operation state in which an operation state entry flag is not stored among the series of operation states comprises:

identifying that an error occurs in the operation state in which the operation state entry flag is not stored.

6. The method of claim 1, further comprising:

calculating a number of the plurality of tasks before the plurality of tasks are executed;

checking whether the number of normally executed tasks matches the number of tasks calculated before the execution when the execution of the plurality of tasks is completed; and determining that task omission occurs when the number of normally executed tasks does not match the number of tasks calculated before the execution.

7. The method of claim 6, wherein calculating the number of the plurality of tasks before the plurality of tasks are executed comprises:

calculating the number of the plurality of tasks by executing a first period task of each of the plurality of tasks at a time of initializing an OS.

8. The method of claim 6, wherein checking whether the number of normally executed tasks matches the number of tasks calculated before the execution when the execution of the plurality of tasks is completed comprises:

storing the number of normally executed tasks among the plurality of tasks in a predetermined storage medium at a time when the execution of each of the plurality of tasks is completed; and comparing the number of the stored normally executed tasks and the number of tasks calculated before the execution.

9. The method of claim 1, wherein identifying whether each of the plurality of tasks is in an abnormal state by using the result of the reading the operation state entry flag comprises:

resetting a CPU when a task of the plurality of tasks is in an abnormal state or an error occurs.

10. The method of claim 1, wherein the predetermined storage medium is a local memory area (LMU).

11. The method of claim 1, further comprising:

allocating a dynamic memory for writing a flag variable of the task at a time when a first task among the plurality of tasks is executed; and returning the dynamic memory when execution of the last task of the plurality of tasks is completed.

12. A non-transitory computer-readable recording medium storing a program recorded thereon, the program to direct a processor of a multi-core structure, the multi- core structure including a plurality of cores and a monitoring core, to perform acts of:

by the monitoring core, acquiring a result of reading an operation state entry flag written in a predetermined storage medium when each of a plurality of tasks enters a new operation state in the plurality of cores, wherein each of the plurality of tasks is executed through a series of operation states that are sequentially passed through, in the plurality of cores;

by the monitoring core, identifying whether each of the plurality of tasks is in an abnormal state by using the result of the reading the operation state entry flag; and by the monitoring core, executing an exception handling operating related to the task identified as being in the abnormal state, wherein the series of operation states include a first state of adding a task of the plurality of tasks to a buffer and requesting an interrupt, a second state of scheduling the task added to the buffer to an Operating System (OS), a third state of operating the task by the scheduling, and a fourth state in which the operation of the task is completed.

13. A computing device of a multi-core structure, the computing device comprising:

a processor of a multi-core structure including a plurality of cores configured to execute one or more tasks among a plurality of tasks and a monitoring core configured to execute a monitoring operation of each of the plurality of tasks; and a local memory area, to which a flag variable of each of the plurality of tasks is allocated, wherein the processor executes a computer program including computer-executable instructions for performing operations comprising:

by the monitoring core, acquiring a result of reading an operation state entry flag written in the local memory area when each of the plurality of tasks enters a new operation state in the plurality of cores, wherein the each of the plurality of tasks executed through a series of operation states are sequentially passed through, in the plurality of cores, by the monitoring core, identifying whether each of the plurality of tasks is in an abnormal state by using the result of the reading of the operation state entry flag, and by the monitoring core, executing an exception handling operating related to the task identified as being in the abnormal state, wherein the series of operation states include a first state of adding a task of the plurality of tasks to a buffer and requesting an interrupt, a second state of scheduling the task added to the buffer to an Operating System (OS), a third state of operating the task by the scheduling, and a fourth state in which the operation of the task is completed.

* * * * *